(12) United States Patent
Burkert et al.

(10) Patent No.: US 7,215,683 B2
(45) Date of Patent: May 8, 2007

(54) METHOD AND APPARATUS FOR PROTECTING AGAINST PACKET LOSSES IN PACKET-ORIENTED DATA TRANSMISSION

(75) Inventors: Frank Burkert, Munich (DE); Robert Kutka, Geltendorf (DE); Wenrong Weng, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 870 days.

(21) Appl. No.: 09/905,193

(22) Filed: Jul. 16, 2001

(65) Prior Publication Data

US 2002/0027911 A1    Mar. 7, 2002

(30) Foreign Application Priority Data

Jul. 14, 2000    (DE) ................ 100 34 261

(51) Int. Cl.
*H04J 3/00*    (2006.01)
*H03M 13/00*    (2006.01)
(52) U.S. Cl. .................... 370/476; 714/752
(58) Field of Classification Search ........ 370/473–474, 370/476–477, 394, 229, 389; 714/746, 748–749, 714/752, 799
See application file for complete search history.

(56) References Cited

U.S. PATENT DOCUMENTS

| 4,161,719 | A |  | 7/1979 | Parikh et al. |
| 4,888,767 | A |  | 12/1989 | Furuya et al. |
| 5,696,764 | A | * | 12/1997 | Soumiya et al. ........ 370/395.41 |
| 6,000,053 | A | * | 12/1999 | Levine et al. ................ 714/766 |
| 6,141,784 | A | * | 10/2000 | Davis et al. ................. 714/748 |
| 6,141,788 | A |  | 10/2000 | Rosenberg et al. |
| 6,310,892 | B1 | * | 10/2001 | Olkin ......................... 370/473 |
| 6,438,723 | B1 | * | 8/2002 | Kalliojarvi ................... 714/751 |
| 6,445,717 | B1 | * | 9/2002 | Gibson et al. .............. 370/473 |
| 6,556,588 | B2 | * | 4/2003 | Wan et al. ................... 370/474 |
| 6,668,290 | B1 | * | 12/2003 | Nelson ........................ 710/52 |
| 2002/0141585 | A1 | * | 10/2002 | Carr ........................... 380/255 |
| 2004/0078624 | A1 | * | 4/2004 | Maxemchuk et al. .......... 714/4 |

OTHER PUBLICATIONS

C. Perkins et al., "RTP Payload for Redundant Audio Data," RFC 2198 IETF Network Working Group, Sep. 1997, pp. 1-11.
J. Rosenberg et al., "IETF RFC 2733—An RTP Payload Format for Generic Forward Error Correction", May 1999.
J. Rosenberg et al., "IETF internet Draft—An RTP Payload Format for Reed Solomon codes", Aug. 1999.
Shu Lin et al., "Error Control Coding", Prentice-Hall, 1983, pp. 367-370.

* cited by examiner

*Primary Examiner*—Kevin C. Harper
(74) *Attorney, Agent, or Firm*—Staas & Halsey LLP

(57) ABSTRACT

Individual data packets are transmitted together with information about the end of a respective data packet, without padding, and then virtual padding is effected for generating redundant packets. At the receiver, the data packets are obtained using the information about the respective end of packet if no packet was lost, and are only expanded by padding if a packet has been lost and can be reconstructed by one or more redundant packets.

5 Claims, 1 Drawing Sheet

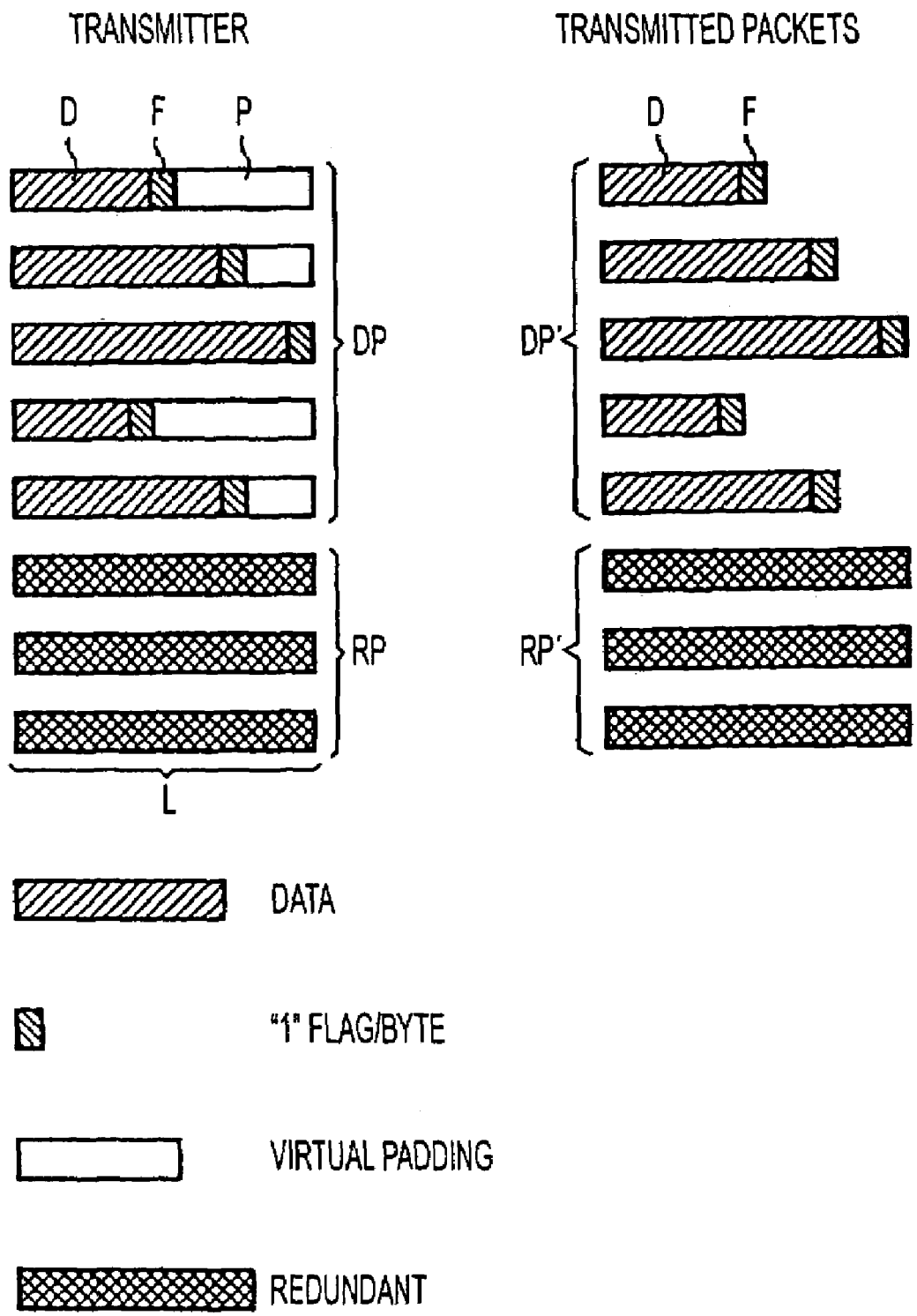

METHOD AND APPARATUS FOR PROTECTING AGAINST PACKET LOSSES IN PACKET-ORIENTED DATA TRANSMISSION

BACKGROUND OF THE INVENTION

1. Field of the Invention

The invention relates to a method and an arrangement for protecting against packet losses in packet-oriented transmission of data in which, in particular, the size of the data packets varies greatly, as is the case, for example, with video data, such packet losses mainly being caused by overloading at network nodes in landline networks and due to atmospheric interference and multi-path propagation in mobile channels.

2. Description of the Related Art

The currently most widely used protocols on the transport layer (Layer 4) are user datagram protocol (UDP) and transmission control protocol (TCP) which react very sensitively to bit errors in received packets. As soon as a bit error is detected in a packet by an error-detecting code, the affected packet is discarded or erased. In other words, packet loss also occurs. So-called reliable transport protocols such as TCP use automatic repeat request methods to be able to transport lost or discarded packets reliably to the receiver in spite of disturbed channels. However, this is associated with a very great increase in transmission delay which, however, cannot be tolerated by many applications (for example, communication applications). For this reason, unreliable transport protocols such as, for example, UDP, are used in this case. Although these do not cause any increase in delay, they do not offer any mechanisms for compensating for packet losses either. For this reason, intensive efforts have been made for some time in the Audio-Visual Transport Group (AVT) of the Internet Engineering Task Force (IETF) to connect forward error correction (FEC) methods and packet-oriented transmission with unreliable transport protocols. The principles of these methods are described in IETF RFC 2733—An RTP Payload Format for Generic Forward Error Correction and IETF Internet Draft—An RTP Payload Format for Reed Solomon Codes, both by J. Rosenberg and H. Schulzrinne and will be briefly presented in the section following. These methods are very inefficient with respect to the bandwidth needed, especially in the case of variable-bit-rate data sources, for example video.

In the case of packet losses, the data are not corrupted but are completely lost and so-called erasures occur as described in "Error Control Coding", by Shu Lin and Daniel Costello, Prentice-Hall, 1983. Since each packet-oriented transport protocol uses sequence numbers, the receiver knows which packets have been lost in a sequence. The coding theory offers a multiplicity of methods for fighting erasures. The IETF, which decides on the standardization of IP-based transport protocols, has recently developed much activity for integrating methods for protecting against packet losses into their real-time transport protocols (RTP), as described by Rosenberg et al. Although these methods use a number of different codes as far as coding is concerned, the basic principle is the same in all approaches. In the transmitter, n, n=1 successive data packets of the source are in each case protected against erasures. As soon as a data packet comes from the source, it is copied into a memory. If the nth packet is available, coding is carried out. Since the data packets in the memory can be generally of different sizes, they are first made the same size. For this purpose, the length, that is to say the number of bytes in a data packet, of the largest data packet is determined and all shorter packets are expanded to this length by adding known bits or symbols, for example zeros. This process is called padding. After that, the packets, which are now of the same size, are combined with one another with the aid of a coding rule of any systematic code. These can be either simple parity codes or complex block codes. Similarly, the coding can be carried out at bit level or at symbol level with appropriate segmenting. Depending on the coding rule, the combining results in a number of redundant packets which, together with the data packets, are then transmitted to the receiver in accordance with the transport and network protocols used. These redundant packets enable the receiver to reconstruct the payload of any lost packets. If the data packets vary greatly in their size, as is the case, for example, with video data, a very large number of symbols which are absolutely redundant must be transmitted in the data packets due to the padding, as a result of which the coding is extremely inefficient with regard to economic utilization of the transmission channel.

If, for example n=5 data packets with lengths of 200, 400, 800, 500 and 600 bytes are used and three redundant packets are generated, the maximum length is 800 bytes and a total of 1500 bytes are therefore needed for the padding, which must be transmitted without being useful for error protection and for source decoding.

SUMMARY OF THE INVENTION

An object of the invention is to protect against packet losses in packet-oriented transmission of data, particularly when the size of the data packets varies greatly.

This object is achieved by an apparatus including a transmitter to form and transmit data packets with end-of-packet information prior to generating redundant packets and a receiver to receive the data packets from said transmitter, remove the end-of-packet information and, only if a data packet was lost during transmission and this error can be reconstructed, expand the data packets with the aid of padding information to form equally long data packets before the end-of-packet information is removed.

In other words, individual data packets are transmitted together with information about the end of a respective data packet, without padding, and then virtual padding is effected for generating the redundant packets. At the receiver, the data packets are obtained using the information about the respective end of packet if no packet was lost, and they are only expanded by padding if a packet has been lost and can be reconstructed by one or more redundant packets.

BRIEF DESCRIPTION OF THE DRAWINGS

FIG. 1 is an explanatory diagram of data packets.

DETAILED DESCRIPTION OF THE PREFERRED EMBODIMENTS

To explain an exemplary embodiment of the invention in greater detail, FIG. 1 illustrates data packets DP and redundant packets RP at the transmitter and transmitted packets, including data packets DP' and redundant packets RP' at the receiver. The data packets DP and redundant packets RP, RP' all have the same maximum length L. The data packets DP consist of incoming data packets D, an end-of-packet information item in the form of a flag byte F and padding information P. On the other hand, the data packets DP' lack the padding information P, since the padding information P is only provided at the transmitter end by so-called virtual padding after the transmission of the data packets DP'. The end-of-packet information does not necessarily have to be one byte long but can also have a different word length.

The incoming data packets D are initially copied into a memory at the transmitter. Immediately after the copying process, the data packet D is extended by one flag byte F, for example a leading 1, to become the data packet DP' and is then immediately transmitted but still remains as a copy in the memory. If n data packets DP are again available in the memory, the coding is carried out as described above, that is to say including the padding which, however, is now carried out mandatorily with known padding data P, for example with zeros. The essential factor here is that the padding is only carried out after the transmission of the data packets, which is why it can be called virtual padding. The redundant packets RP still have the same length L as the longest data packet DP after the coding.

If no packets are lost during the transmission, the receiver simply removes the flag byte F, for example the leading 1, from each received data packet DP', and immediately obtains the original data packets D.

If one or more packets are lost, regardless of whether they are data packets or redundant packets, the receiver also carries out virtual padding before the decoding, that is to say all data packets DP' are brought to have the same length L, for example by adding zeros, if the erasure pattern which has occurred can be corrected and this length is known, therefore. If a data packet is lost, at least one redundant packet RP' is needed for the reconstruction, the lengths of the redundant packets corresponding to the length L of the longest data packet.

After the decoding, the reconstructed data packets have the length of the longest data packet since they contain the padding bits. However, these can easily be removed by removing the padding data and the flag byte from each packet. The data packets DP thus have their original size again. Due to the virtual padding, the transmission is much more efficient without this reducing the protection against packet losses. In comparison with the above example, 1492 bytes fewer need to be transmitted in this way. This leads to much more efficient utilization of the valuable bandwidth resource, especially in the case of wireless transmission.

In another exemplary embodiment, the virtual padding is signaled via fields in the header. In this arrangement, the length of the largest packet is transmitted in the header of each packet and a flag byte, such as, for example, a leading 1, can be omitted. Although this exemplary embodiment of the invention also makes it possible to dispense with the transmission of useless bytes, a number of disadvantages must be accepted in return compared with the first exemplary embodiment. On the one hand, at least two bytes are used instead of one flag byte for signaling the length and, on the other hand, a delay is caused in the encoder since it is now necessary to wait for all n data packets before being able to begin the transmission because it is first necessary to determine the length of the longest data packet before the transmission. In a streaming application, this means additional memory requirement. As well as this, integration into existing payload formats is more difficult since headers which are already standardized must be expanded.

What is claimed is:

1. A method for protecting against packet losses in packet-oriented data transmission, comprising:
    storing n data packets in a memory together with end-of-packet information;
    transmitting the data packets from a transmitter to a receiver with a flag byte providing end-of-packet information at the end of each data packet;
    converting at the transmitter, after said transmitting of the data packets, the stored data packets into n equal-sized data packets, each having a length equal to a longest one of the data packets, by filling with known padding data and then converting the n equal-sized data packets into redundancy packets by coding;
    transmitting the equal-sized redundancy packets;
    obtaining reproduced data packets from received data packets including the end-of-packet information received from the transmitter by the receiver, if no packet has been lost during transmission;
    converting, if at least one packet is lost during the transmission and this error is correctable, all of the received data packets into equal-sized reconstructed data packets, by filling with the known padding data; and
    obtaining at the receiver, if at least one lost packet is not received and this error is correctable, the reproduced data packets from the equal-sized reconstructed data packets, the end-of-packet information and at least one equal-sized redundancy packet received from the transmitter to replace the at least one lost packet.

2. The method as claimed in claim 1, wherein the end-of-packet information is provided by stating the packet length in the respective packet header.

3. The method as claimed in claim 1,
    wherein, if no packet was lost, removing the flag byte from the reproduced data packets, and
    wherein, if at least one packet was lost and this error can be corrected, removing the flag byte and any subsequent padding data from the reproduced data packets.

4. An apparatus for protecting against packet losses in packet-oriented data transmission, comprising:
    a transmitter to form and transmit data packets with a flag byte providing end-of-packet information at the end of each packet prior to generating redundancy packets; and
    a receiver to receive the data packets from said transmitter, remove the end-of-packet information and, only if a data packet was lost during transmission and this error can be reconstructed, expand the data packets with the aid of padding information to form equally long data packets before the end-of-packet information is removed.

5. An apparatus for protecting against packet losses in packet-oriented data transmission, comprising:
    a transmitter forming and transmitting data packets with a flag byte providing end-of-packet information at the end of each packet prior to generating redundant equal-sized packets, each having a length equal to a longest one of the data packets, by filling with known padding data and then converting the equal-sized data packets into redundancy packets by coding; and
    a receiver receiving the data packets from said transmitter and, if a data packet was not received successfully and can be reconstructed, reconstructing the data packet using at least a corresponding redundant equal-sized packet received from the transmitter after converting the received data packets into equal-sized reconstructed data packets, by filling with the known padding data.

* * * * *